United States Patent Office 2,734,927
Patented Feb. 14, 1956

2,734,927
PROCESS OF PRODUCING PERCHLOROINDAN

Heinrich Vollmann, Leverkusen-Wiesdorf, Germany, assignor to Farbenfabriken Bayer Aktiengesellschaft, Leverkusen, Germany, a corporation of Germany No Drawing. Application February 10, 1953,
Serial No. 336,205

Claims priority, application Germany February 13, 1952

4 Claims. (Cl. 260—650)

This invention relates to the production of perchloroindan. It is known that by exhaustive chlorination of naphthalene in the presence of iron chloride, according to W. J. Schwemberger and M. W. Gordon (cf. Zentralblatt 1939, II, 3690, original work appeared in Russian Journal obschtschej chimiji 8, 1353–1360 (1938)), the naphthalene molecule is subjected to ring reduction with the formation of perchloroindan and carbon tetrachloride. According to the statements set forth by the above-named authors the readily volatile cleavage product of this process, carbon tetrachloride, is obtained in a yield amounting to more than 90% of the theoretical (1 $CCl_4$ calc. upon 1 $C_{10}H_8$), while the yield of perchloroindan obtained has not been illustrated by figures. In the disclosure it is said that the crude product is a dark, almost black, crystalline substance which is rich in resinous impurities. From this crude product pure perchloroindan was obtained by repeated recrystallization. According to our own investigations when working according to the process of Schwemberger and Gordon the yields of pure product obtained amounted to 60–65% of the theoretical. According to Roedig (Chemische Berichte 80, 210, 1947) a yield of crude product of about 70% of the theoretical is obtained when using a mixture of hexachloronaphthalene as starting product in the reaction according to Schwemberger and Gordon.

In accordance with the present invention it has been found that perchloroindan can be obtained in a yield amounting to 95% of the theoretical and, apart from the contents of catalyst such as $FeCl_3$, in almost pure quality, when causing chlorine to act upon perchloronaphthalenes containing less than two hydrogen atoms, in the presence of iron chloride, at temperatures up to about 250° C. As starting products either octachloronaphthalene, melting at 192° C., or pure octachloronaphthalene-1.4-dichloride (decomposing at 206° C. while splitting off chlorine, obtained by chlorinating naphthalene in sulfurylchloride with $FeCl_3$ and chlorine at 50–60° C.), or a crude mixture of the two products, as can be obtained according to Example 1, paragraph 1 of the present application from naphthalene directly, may be used.

The invention is based on the discovery that the resinous higher molecular side products, which during the cleavage of naphthalene to perchloroindan by means of chlorine decrease the yields and render purification difficult when working according to the hitherto known methods, are no side products of the cleavage reaction but are formed during the chlorination of naphthalene if Friedel-Crafts catalysts, for instance, $FeCl_3$, are present.

Tests made have shown that perchloroindan (containing 3 $CCl_2$ groups) as well as perchloroindene (containing 1 $CCl_2$ group) and also octachloronaphthalene-1.4-dichloride (containing 2 $CCl_2$ groups) readily react with benzene or all chloronaphthalenes still containing hydrogen, in the presence of iron chloride while hydrochloric acid escapes and higher molecular condensation products are formed. These resin-forming side reactions may be completely avoided when working according to the process of the present invention.

For producing pure perchloroindan it is also essential to lower the end temperature after completion of the cleavage reaction—detectable when no more carbon tetrachloride develops—possibly to below 200° C. say to about 145° C., that is somewhat above the melting point of pure perchloroindan, since at higher temperatures an equilibrium between perchloroindan (melting point=135° C.) and perchloroindene (melting point=132° C.) is formed and mixtures of these two compounds display a lower melting point and have a poor crystallizing power.

The invention is further illustrated by the following examples without being restricted thereto:

Example 1

750 parts by weight of pure naphthalene are treated with chlorine in an apparatus which is free from iron and wherein gas is well distributed while adding 15 parts by weight of antimony pentachloride. Because of the strong exothermic reaction it is necessary to cool the mixture so that the temperature does not exceed 150° C. Then—by appropriately choking the addition of chlorine—the mixture is heated under reflux up to 190° C.

Test portions taken during chlorination show the known wax properties in the tetra up to the penta stage. Later on they crystallize in long crystals whereby the melting point rises to 165° C. up to max. 185° C. (with a melting interval of about 5° C.). At the maximum melting point an almost pure octachloronaphthalene melting at 192° C. is present which dissolves colorless in chlorosulfonic acid.

When adding more chlorine by cooling from 190° C. to 160° C. the melting point of the test portions gradually drops to 148–158° C. A mixture of octachloronaphthalene with octachloronaphthalene-1.4-dichloride is obtained. A test portion dissolves in chlorosulfonic acid with intensive violet coloration. This coloration is characteristic for the octachloronaphthalene-1.4-dichloride which crystallizes from benzene or chloroform in colorless, bright, coarse prisms and which when rapidly heated decomposes at about 206° C. while splitting off chlorine with quantitative conversion into octachloronaphthalene.

When heating a test portion to 250° C. in this stage of chlorination chlorine escapes, and the melting point again rises up to maximum 185° C. This heated test portion again dissolves colorless in chlorosulfonic acid.

After this stage of chlorination is reached, 7 parts by weight of iron powder are added and a descending cooler with a cooled receiver is attached.

When adding more chlorine the splitting off of carbon tetrachloride sets in within a few minutes at temperatures ranging from 190–200° C. The carbon tetrachloride is collected in the receiver. Since no further evolution of gas takes place it is necessary to add only the quantity of chlorine which is taken up. The speed at which the cleavage reaction takes place depends on the distribution of gas in the reaction vessel when working in the manner described above.

Test portions taken during the splitting off of carbon tetrachloride have an only poor crystallizing power since mixtures of substances are present (octachloronaphthalene, octachloronaphthalene-1.4-dichloride, perchloroindan, perchloroindene, carbon tetrachloride, and presumably also perchloro-tetrahydronaphthalene and 1-trichloromethyl perchloroindan). After all carbon tetrachloride has separated the crude substance still contains much perchloroindene which is detectable from the reddish-brown coloration when dissolved in cold chlorosulfonic acid. By adding further quantities of chlorine the temperature is gradually lowered to 140° C. up to 150° C. until a test portion in chlorosulfonic acid no longer dissolves with red but with light-yellow coloration. In that stage of chlorination a test portion solidifies rapidly and completely crystalline. The color of the powdery crude substance is light-gray; it sinters from 120° C. and melts at about 130° C. The yield obtained amounts to 660 parts by weight which is equal to 97% of the theoretical.

*Example 2*

When using in the process described in Example 1 instead of naphthalene the equivalent quantity of distilled octachloronaphthalene or an equivalent quantity of octachloronaphthalene-1.4-dichloride iron powder may be added directly and working may be effected as indicated in Example 1. In this manner an almost pure, almost colorless perchloroindan which solidifies to coarse crystals and melts at 128–133° C. is obtained in a very much shorter time and in a yield of 97% and more. The melting point of the pure substance is 135.5° C.

I claim:

1. A process for the production of perchloroindan, which comprises chlorinating a compound selected from the group consisting of octachloronaphthalene and octachloronaphthalene-1, 4-dichloride in the presence of iron chloride at temperatures below 250° C.

2. The process as claimed in claim 1 in which the chlorination is continued at temperatures below 200° C. after the development of carbon tetrachloride has ceased until the perchloroindene present has disappeared.

3. A process for the production of perchloroindan, which comprises chlorinating naphthalene in the absence of iron chloride to obtain a perchloronaphthalene and thereafter chlorinating said perchloronaphthalene in the presence of iron chloride at temperatures below 250° C.

4. The process as claimed in claim 3 in which the chlorination is continued at temperatures below 200° C. after the development of carbon tetrachloride has ceased until the perchloroindene present has disappeared.

References Cited in the file of this patent

UNITED STATES PATENTS

| 914,223 | Aylsworth | Mar. 2, 1909 |
| 1,933,422 | Engelhardt | Oct. 31, 1933 |
| 2,608,591 | Lawlor | Aug. 26, 1952 |

OTHER REFERENCES

Huntress: Organic Chlorine Compound, pp. 461–462 (1948).